March 26, 1968    H. NAGEL    3,375,126
COMPOSITE FILM STRUCTURE AND PROCESS
Filed Nov. 4, 1964
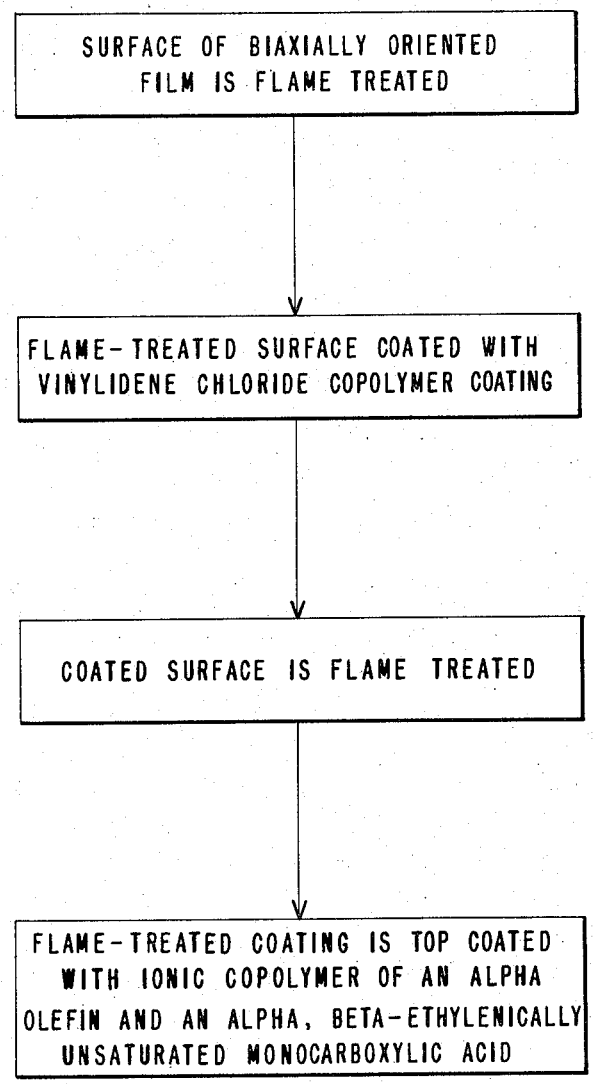
INVENTOR
HERBERT NAGEL
BY
ATTORNEY United States Patent Office 3,375,126
Patented Mar. 26, 1968

3,375,126
COMPOSITE FILM STRUCTURE AND PROCESS
Herbert Nagel, Wilmington, Del., assignor to E. I. du Pont de Nemours and Company, Wilmington, Del., a corporation of Delaware
Filed Nov. 4, 1964, Ser. No. 408,744
6 Claims. (Cl. 117—46)

ABSTRACT OF THE DISCLOSURE

One surface of biaxially oriented polypropylene film is passed through the primary cone of a flame produced by the combustion of a gaseous mixture consisting of gaseous hydrocarbon fuel and oxygen-enriched air, the fuel equivalence ratio of said mixture being between 0.90 and 1.25, and the oxygen ratio being between 0.25 and 0.30, while supporting the film on a surface maintained at a temperature between 45° and 75° C. The resulting treated surface is coated with a vinylidene chloride copolymer coating which is, in turn, flame-treated under the same conditions, and the treated surface of the coating is top coated with an ionic copolymer coating to form a composite film structure.

---

The present invention relates to plastic films and more particularly to a composite thermoplastic film bearing a readily heat sealable surface layer.

In the development of films for various applications it has been necessary in many cases to provide means for readily sealing such films into packages and to improve the films in other respects such as abrasion resistance, resistance to greases and permeation of undesired vapors. Commonly this is achieved by applying a coating of a suitable resin on one or more of the film surfaces. Also a suitable composite, i.e., laminar, structure may be provided which has at least one surface which is readily heat sealable. In many instances, however, such a film does not have a suitable balance of properties. In particular it has been difficult to find suitable resin coatings which would impart toughness characteristics to the films such as good resistance to abrasion, resistance to penetration of undesired liquids and vapors and at the same time to be readily heat sealable over a range of temperatures and particularly at a low enough temperature to be readily adaptable for high speed packaging operation. In many cases where a composite film structure can be employed to advantage it is generally essential to have a structure in which the layers of the respective films are very firmly adhered to each other so that delamination does not occur under conditions of use.

It is therefore an object of this invention to provide composite or coated thermoplastic films having good toughness characteristics, high resistance to permeation of organic liquids and vapors and ready heat sealability. The foregoing and related objects will more clearly appear from the following detailed description.

These objects are realized by the present invention which, briefly stated, comprises, in combination, the steps of (1) passing biaxially oriented polypropylene film through a flame emanating from the discharge opening of a burner supplied with a gaseous mixture of a hydrocarbon fuel and oxygen-enriched air, said fuel being selected from the group of hydrocarbon consisting of paraffinic and olefinic hydrocarbons, the fuel equivalence ratio of said gaseous mixture being between 0.90 and 1.25, the oxygen ratio of said gaseous mixture being between 0.25 and 0.30, the path of the film as it traverses the flame being located at a distance from the burner less than the length of the unimpeded primary envelope of the flame but not less than the distance below which the velocity of the burning gases escaping from the immediate vicinity of said discharge opening exceeds the burning velocity of said flame, the surface on which said film is supported as it traverses the flame being heated and maintained at a temperature between 45° and 75° C., the exposure of the film to the action of the flame being between 0.0005 and 0.1 second, whereby to lower the contact angle of the film surface being treated to a value below 65°; (2) applying to the treated surface a continuous coating of an interpolymer of vinylidene chloride and at least one other ethylenically unsaturated monomer polymerizable therewith, said interpolymer containing from 75 to 95% by weight, based on the total weight of interpolymer, of vinylidene chloride; (3) passing said coated film through a flame under the conditions of Step 1 to treat the coated surface of the film; and (4) thereafter melt-extruding upon the flame treated coated surface a continuous coating of an ionic copolymer of an alpha olefin having the general formula R—CH$_2$=CH$_2$, where R is a radical selected from the class consisting of hydrogen and alkyl radicals having 1 to 8 carbon atoms, the olefin content of said copolymer being at least 50 mol percent based on the polymer, and an alpha, beta-ethylenically unsaturated monocarboxylic acid, the acid monomer content of said copolymer being from 5–25 mol percent based on the copolymer, said copolymer having a melt index between 0.5 and 40, said copolymer containing uniformly distributed throughout a metal ion having an ionized valence of 1 to 3, inclusive, at least 30% of the carboxylic acid groups of said copolymer being neutralized by the said metal ions and existing in an ionic state.

The accompanying drawing illustrates diagrammatically the essential process steps of my invention.

The expression "fuel equivalence ratio," employed herein in defining the gaseous mixture supplied to the burner, is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right for a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

The "primary envelope" of a stable, self-sustaining flame used in carrying out the process of this invention is readily discerned as the luminous, pale blue inner portion of the flame nearer the discharge opening of the burner (roughly conical in shape for a circular discharge opening and wedge-shaped for a rectangular discharge opening) and is readily distinguished from the fainter, less luminous secondary sheath or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingement on any surface or by the proximate passage of any surface.

An essential feature of the process of this invention is that the gaseous mixture which provides the flame from the burner must be such that the flame is essentially neutral, to slightly reducing, in its action. To insure such a flame it is required that the fuel equivalence ratio of the gaseous mixture be maintained between 1.00 and 1.10 and preferably around 1.05. However, for some purposes, satisfactory adhesion of the coating subsequently applied to the flame-treated film and to the copolymer-coated film may be obtained with a fuel equivalence ratio as low as 0.90, and as high as 1.25, with better adhesion shown when ratios above 1.00 are used. It is further required that the oxygen ratio of the gaseous mixture be maintained within the range of from 0.25 to 0.30. Little benefit is to be gained from operating higher oxygen ratios, and there is a tendency, also associated with the use of a high drum temperature, for the film to exhibit some surface haze and some impairment of desirable physical properties. At ratios much below 0.25 the adhesion values of the coatings rapidly diminish. While the invention is illustrated with propane as the fuel gas for the flame treatment, the process is, of course, operable with other hydrocarbon fuels such as butane, ethane, ethylene, and the like or with a mixture of such gases.

In order to achieve satisfactory flame treatment the surface of the film or coating undergoing treatment should be spaced from the discharge opening of the burner a distance less than the length of the unimpeded primary envelope of the flame but not less than the distance below which the velocity of the burning gases escaping from the immediate vicinity of the discharge opening exceeds the burning velocity of the flame.

The film supporting surface in contact with the surface of the film directly opposite the surface of film undergoing flame treatment should be heated at a temperature within the range of from 45° C. to 75° C. The time during which the film or coating surface is exposed to the action of the flame may vary from as little as 0.0005 of a second to as long as 0.1 of a second. In practice, the film is passed through the flame treating station at the rate of from 200 to about 500 feet per minute.

The contact angle of the film surface determined as hereinafter set forth, serves as a measure of the wettability of the film surface which in turn is indicative of the adherability of the film surface. Thus, the surface of untreated, biaxially oriented polypropylene film has a contact angle of about 93° and is substantially non-adherent to coatings. However, when such a film is flame treated under the conditions hereinbefore specified the contact angle is reduced to 65° or less and is strongly adherent to vinylidene chloride interpolymer coating applied thereon. Similarly, flame treatment of the surface of the applied coating under the same conditions, in turn renders the coated surface strongly adherent to the final top coating of copolymer to the end that the composite coating is easily heat sealed to form strong seals and is extremely durable and resistant to delamination under conditions encountered in subsequent processing and use.

The interpolymers of vinylidenechloride preferred for purposes of the invention are those containing from 75 to 95% by weight, of vinylidene chloride, based on the total weight of the polymer, and from 5 to 25% by weight of one or more ethylenically unsaturated monomers copolymerizable therewith. A preferred interpolymer is that containing between 90 to 94%, by weight, of vinylidene chloride, between 5.9 to 7.9% of an alkyl acrylate wherein the alkyl group has from 1 to 3 carbon atoms, and from 1.9 to 3.0% of acrylic acid. Representative mono-olefinic monomers copolymerizable with vinylidene chloride include: methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl aplha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide and alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. The compounds may be generally defined as vinyl or vinylidene compounds having a single $CH_2=C<$ group. The most useful monomers fall within the general formula.

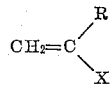

where R may be hydrogen, halogen, or saturated aliphatic radical, and X is a member of the group consisting of —Cl, —Br, —F, —CN, —$C_6H_5$, —COOH,

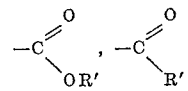

—HC=O, —$OC_6H_5$, —$CONH_2$, —CONH—R' and —$CONHR'_2$ in which R' is alkyl.

The vinylidene chloride interpolymer coating is preferably applied from an aqueous dispersion of the interpolymer containing between 40 and 50% solids. Application may be accomplished by any convenient coating technique to secure a coating having an optimum thickness of about 0.15 mil (i.e., about 6 grams of coating per square meter of film surface).

The ionic copolymers employed as the heat-sealable top coat or lamina herein are prepared by copolymerizing a mixture of alpha-olefin of the formula

where R is selected from the class consisting of hydrogen and alkyl radicals having 1 to 8 carbon atoms, and alpha, beta-ethylenically unsaturated monocarboxylic acid, at temperatures of 150° to 300° C., and pressures of 50 to 3000 atmospheres, and in the presence of a free radical polymerization initiator such as a peroxide, followed by reacting the copolymer with an ionizable metal compound to effect cross-linking of the copolymer to form an ionized copolymer, all as described and claimed in copending application Ser. No. 271,477, filed Apr. 8, 1963, in the name of R. W. Rees, now U.S. Patent No. 3,264,272.

As indicated, the alpha-olefins employed in the copolymer are alpha-olefins which have the general formula R—$CH_2=CH_2$ where R is either a hydrogen or an alkyl group having from 1 to 8 carbon atoms. Thus suitable olefins include ethylene, propylene, butene-1, pentene-1, hexene-1, heptene-1, 3-methylbutene-1, 4-methylpentene-1, etc. The concentration of the alpha-olefin is at least 50 mol percent in the copolymer, and is preferably greater than 80 mol percent.

The second essential component of the copolymer comprises an alpha, beta-ethylenically unsaturated monocarboxylic acid monomer having preferably from 3 to 8 carbon atoms. Examples of such monomers are acrylic acid, methacrylic acid, ethacrylic acid, etc. As indicated the concentration of the acidic monomers in the copolymers is from 5 to 25 mol percent, and preferably from 10 to 20 mol percent.

The molecular weight of the copolymers is most suitably defined by melt index, a measure of viscosity, described in detail in ASTM-D-1238-57T. For application as a thermoplastic film coating, the copolymer should have a melt index in the range of 0.1 to 40 g./10 min., and preferably in the range of 0.5 to 10 g./10 min.

The ionic copolymers are obtained by neutralization of the initial copolymer with an ionizable (water-soluble) metal compound yielding a metal ion having an ionized valence of 1 to 3 inclusive. The concentration of the metal ion should be such that as least 30% of the carboxylic acid groups of the copolymer are neutralized; and exist in an ionic state. Suitable monovalent metal ions are $Na^+$, $K^+$, $Li^+$, $Cs^+$, $Ag^+$, $Hg^+$, and $Cu$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, and $Zn^{+2}$. Suitable trivalent metal ions are $Al^{+3}$, $Sc^{+3}$, $Fe^{+3}$, and $Y^{+3}$. The preferred metals are the alkali metals. Preferred metal salts include formates, acetates, hydroxides of sufficient water solubility, methoxides, ethoxides, nitrates, carbonates, and bicarbonates. The cross-linking or neutralization reaction is carried out under conditions which allow for a homogeneous uniform distribution of the metal ion throughout the copolymer mass. No particular reaction conditions are essential except that the conditions should permit removal of the hydrogen-salt radical reaction product which is preferably accomplished by volatilization.

The following example of a preferred embodiment will serve to further illustrate the practice and principles of this invention.

EXAMPLE

One surface of a one mil thick biaxially oriented polypropylene film was subjected to a flame treatment under the following conditions: lip opening of the burner—100 mils; distance of film from the opening of the burner in passing through the flame—3.0 mm.; length of primary envelope of flame—4.0 mm.; temperature of the drum over which the film was passed—70° C.; oxygen ratio 0.278; fuel equivalence ratio—1.05; film speed—350 feet per minute. The procedure of flame treating followed essentially that described in U.S.P. 2,648,097. Contact angle of the treated film was 60°. Under the same treating conditions, but with the drum temperature held at 40° C., a contact angle of 68° was obtained; at a drum temperature of 90° C. a contact angle of 70° was obtained, the film had a slight haziness in the surface layers and the physical property values appeared to be somewhat impaired.

*Determination of contact angle*

Contact angle, which serves herein as a measure of the wettability of the polymeric surface, may be defined as $$\frac{\theta_a + \theta_r}{2}$$

where $\theta_a$ is the advancing contact angle and $\theta_r$ is the receding contact angle. The procedure for its determination is as follows: Handling the film only with tweezers, a one-half inch by one-inch sample thereof is washed briefly in deionized water and then similarly in methyl ethyl ketone, followed by drying in a circulating air oven for about ten minutes at 60° C. After exposing the sample to a radioactive static eliminator and brushing off any dust with a small camel's hair brush it is placed in the center of the specimen platform of a contact angle goniometer. The contact angle goniometer consists essentially of a microscope mounted with its axis horizontal, equipped with a mechanical stage (the specimen block) that can be raised and lowered or move from side to side. The normal eye piece of the microscope is replaced with a protractor eye piece which is divided into degrees on a rotating scale with a vernier in minutes on a fixed arm. The cross hairs in the eye piece divide the field of view into quadrants. A drop of deionized water is pushed onto the film surface from a capillary dropper mounted above the stage. The capillary dropper is made from an ordinary eye dropper by drawing the tip into a one-inch long capillary with a diameter just small enough to prevent water from running out of the tube under gravitational force only. To assist in dispersing liquid from the dropper the tip of the capillary is ground about 30° off the perpendicular. The protractor scale is then revolved until its cross-hair is parallel to the surface on which the drop is resting. The other cross-hair is adjusted until it is tangent to the drop at the point of contact with the surface on which it is resting. The angle between the cross-hairs inside the drop is read from the protractor scale.

This is the advancing contact angle $\theta_a$. Using the capillary dropper, water is subtracted from the drop on the film sample and the receding contact angle is recorded. For both advancing and receding contact angles the drop perimeter must move and to insure this the drop is viewed as water is being added or subtracted. Due to water evaporation, an advancing water drop will begin to recede within about 30 seconds after it has stopped advancing. Therefore, the advancing contact angle must be measured soon after the drop perimeter has stopped moving. A receding drop may take as much as 30 seconds to come to equilibrium after subtraction of water has stopped. Since water evaporation merely causes more water loss and does not affect the receding contact angle it is best to wait about 30 seconds before taking this reading.

The film, flame treated as described above, was then coated at 50 feet per minute with a coating bath of an aqueous dispersion of a vinylidene chloride interpolymer, excess dispersion was doctored from the film surface and the film was dried in a coating tower. The dried film carried a coating having an average thickness of 6 grams per square meter. The aqueous dispersion used for coating contained 40% solids and comprised 92.5 parts by weight of vinylidene chloride, 7.5 parts by weight of methyl acrylate and 2 parts by weight of acrylic acid. The coated surface was in turn flame treated under the conditions described above.

Thereafter, following the general procedure of melt extrusion described in Can. 545,282, the resulting flame treated vinylidene chloride interpolymer coated film was melt coated at 290° C. with a 1.5 mil thick layer of an ethylene/methacrylic acid copolymer containing 10% of methacrylic acid, ionically crosslinked with sodium hydroxide until 55% of the carboxylic groups have been neutralized, the copolymer having a melt index of 1.2 grams/10 minutes at 190° C.

For comparison the same polypropylene film was flame treated as described above but was not coated with the vinylidene chloride interpolymer; instead it was coated directly with a 1.5 mil thick layer of the same ethylene/methacrylic acid copolymer described above. Comparative heat seal values for the two films are shown below. All heat seals were made at 100° C., p.s.i., and 0.25 second dwell time. The test film made with the flame treated vinylidene chloride interpolymer subcoat showed a heat seal value of 1800 grams/inch whereas the control film made without the vinylidene chloride interpolymer subcoat showed a heat seal strength of 900 grams; a second control made with a vinylidene chloride interpolymer subcoat which was not subsequently flame treated showed a seal strength of about 1000 grams. Peel strength of the test film showed a value of 300 grams/inch whereas the control film made without the subcoat showed a value of only 50 grams/inch.

A particular feature of the test films is their ability to be heat sealed over a broad temperature range, and particularly at relatively low temperatures. To illustrate this latter feature the same polypropylene base film, flame treated, subcoated and again flame treated, was melt coated with a typical melt coating polyethylene resin ("Alathon" 1550). Comparative heat seal values for the biaxially oriented polypropylene film, subcoated and bearing a one mil thick coating of the ionic copolymer as described in this invention and a similar thickness coating of polyethylene resin are shown in tabular form below. All heat seals were made at 10 p.s.i., and 0.25 second dwell time.

| Sealing temperature, ° C. | Heat Seal Strength (g./in.) | |
|---|---|---|
| | Ionic Copolymer Coated | P. E. Coated |
| 100 | 1,800 | 500 |
| 95 | 600 | 30 |
| 90 | 250 | No Seal |

Strong heat seal bonds were also obtained on the ionic copolymer coated film at sealing temperatures as high at 140° C. The broad heat sealing temperature range and particularly the ability of the ionic copolymer coated film to be sealed at low temperatures as well at higher temperatures makes the ionic copolymer well suited for use on films to be applied in high speed wrapping and packaging operations.

Physical property measurements show that elongation of the ionic copolymer coated polypropylene film is greater than is the elongation of the base film without a coating. This is of advantage in various packaging and forming operations wherein the film may be subjected to considerable stress in localized areas. Further, the ionic copolymer coated films are more resistant to oil penetration and to abrasion than corresponding films coated with polyethylene resin.

What is claimed is:

1. A process for producing composite, heat-sealable, vapor-impervious film structures which comprises, in combination, the steps of (1) passing biaxially oriented polypropylene film through a flame emanating from the discharge opening of a burner supplied with a gaseous mixture of a hydrocarbon fuel and oxygen-enriched air, said fuel being selected from the group of hydrocarbons consisting of paraffinic and olefinic hydrocarbons, the fuel equivalence ratio of said gaseous mixture being between 0.90 and 1.25, the oxygen ratio of said gaseous mixture being between 0.25 and 0.30, the path of the film as it traverses the flame being located at a distance from the burner less than the length of the unimpeded primary envelope of the flame but not less than the distance below which the velocity of the burning gases escaping from the immediate vicinity of said discharge opening exceeds the burning velocity of said flame, the surface on which said film is supported as it traverses the flame being heated and maintained at a temperature between 45° and 75° C., the exposure of the film to the action of the flame being between 0.0005 and 0.1 second, whereby to lower the contact angle of the film surface being treated to a value below 65°; (2) applying to the treated surface a continuous coating of an interpolymer of vinylidene chloride and at least one other ethylenically unsaturated monomer polymerizable therewith, said interpolymer containing from 75 to 95% by weight, based on the total weight of interpolymer, of vinylidene chloride; (3) passing said coated film through a flame under the conditions of step 1 to treat the coated surface of the film; and (4) thereafter melt-extruding upon the flame treated coated surface a continuous coating of an ionic copolymer of an alpha olefin having the general formula $$R\!-\!CH_2\!=\!CH_2$$

where R is a radical selected from the class consisting of hydrogen and alkyl radicals having 1 to 8 carbon atoms, the olefin content of said copolymer being at least 50 mol percent based on the polymer, and an alpha, beta-ethylenically unsaturated monocarboxylic acid, the acid monomer content of said copolymer being from 5 to 25 mol percent based on the copolymer, said copolymer having a melt index between 0.5 and 40, said copolymer containing uniformly distributed throughout a metal ion having an ionized valence of 1 to 3, inclusive, at least 30% of the carboxylic acid groups of said copolymer being neutralized by the said metal ions and existing in an ionic state.

2. The process of claim 1 wherein the interpolymer consists of from 90 to 94% by weight, based on the total weight of the polymer, of vinylidene chloride, from 5.9 to 7.9% of an alkyl acrylate wherein the alkyl group has from 1 to 3 carbon atoms, and from 1.9 to 3.0% of acrylic acid.

3. The process of claim 1 wherein the alpha olefin is ethylene, the alpha, beta-ethylenically unsaturated monocarboxylic acid is methacrylic acid, and the metal ion is sodium ion.

4. A heat-sealable, vapor impervious composite film structure produced by the process of claim 1.

5. The composite film structure of claim 4 wherein the interpolymer consists of from 90 to 94% by weight, based on the total weight of the polymer, of vinylidene chloride, from 5.9 to 7.9% of an alkyl acrylate wherein the alkyl group has from 1 to 3 carbon atoms, and from 1.9 to 3.0% of acrylic acid.

6. The composite film structure of claim 4 wherein the alpha olefin is ethylene, the alpha, beta-ethylenically unsaturated monocarboxylic acid is methacrylic acid, and the metal ion is sodium ion.

References Cited
UNITED STATES PATENTS

| | | | |
|---|---|---|---|
| 3,075,857 | 1/1963 | Fior | 117—76 |
| 3,153,683 | 10/1964 | Bryan et al. | 117—46 |
| 3,222,211 | 12/1965 | Updegrove et al. | 117—76 |
| 3,250,639 | 5/1966 | Stead | 117—76 |
| 3,255,034 | 6/1966 | Covington et al. | 117—46 |
| 3,264,272 | 8/1966 | Rees | 260—78.5 |

MURRAY KATZ, *Primary Examiner.*